United States Patent
Nagahori et al.

(10) Patent No.: US 8,523,274 B1
(45) Date of Patent: Sep. 3, 2013

(54) VEHICLE-BODY FRONT STRUCTURE MEMBER

(71) Applicant: F-Tech Inc., Kuki (JP)

(72) Inventors: Katsumi Nagahori, Tochigi (JP); Naohiro Noma, Tochigi (JP); Kou Satou, Ontario (CA)

(73) Assignee: F-Tech Inc., Kuki, Saitama (JP)

( * ) Notice: Subject to any disclaimer, the term of this patent is extended or adjusted under 35 U.S.C. 154(b) by 0 days.

(21) Appl. No.: 13/766,902

(22) Filed: Feb. 14, 2013

(51) Int. Cl.
*B62D 25/08* (2006.01)

(52) U.S. Cl.
USPC ............. 296/187.09; 296/193.09; 296/203.02

(58) Field of Classification Search
USPC ........................... 296/187.09, 193.09, 203.02
See application file for complete search history.

(56) References Cited

U.S. PATENT DOCUMENTS

| 6,893,065 B2 * | 5/2005 | Seksaria et al. ............... 293/133 |
| 2011/0241385 A1 * | 10/2011 | Baccouche et al. ...... 296/203.02 |
| 2012/0153679 A1 * | 6/2012 | Yasuhara et al. ......... 296/203.02 |

FOREIGN PATENT DOCUMENTS

| JP | 2007-112212 A | 5/2007 |
| JP | 4762665 B2 | 8/2011 |

* cited by examiner

*Primary Examiner* — Joseph Pape
(74) *Attorney, Agent, or Firm* — Westerman, Hattori, Daniels & Adrian, LLP

(57) ABSTRACT

A front end of a left member having a first plate thickness, and a left end of a lateral member having a third plate thickness are welded together while defining a first weld line, and a front end of a right member having a second plate thickness and a right end of the lateral member are welded together while defining a second weld line. The first plate thickness and the second plate thickness are thinner than the third plate thickness, and a support bracket that supports an auxiliary equipment is fitted to the lateral member. The first weld line and the second weld line are respectively positioned outer side of the vehicle body with respect to a fitted position of the support bracket, so as not to overlap on the fitted position in the lateral member where the support bracket is fitted to the lateral member.

7 Claims, 3 Drawing Sheets

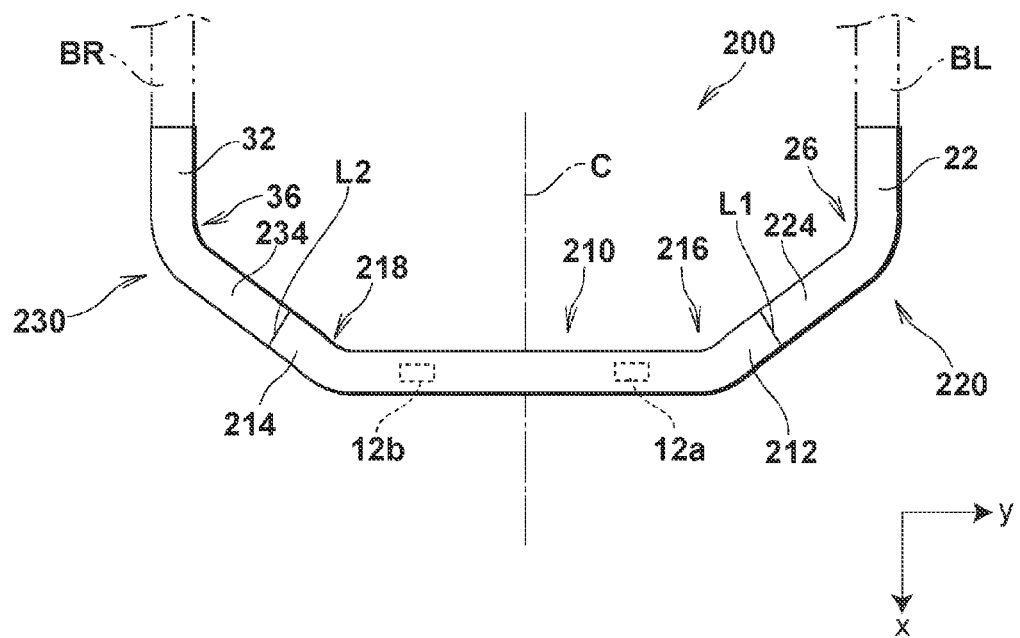

VEHICLE-BODY FRONT STRUCTURE MEMBER

BACKGROUND OF THE INVENTION

The present invention relates to a vehicle-body front structure member, and more particularly relates to a vehicle-body front structure member that can arrange and support an auxiliary equipment at the front of a vehicle body of a vehicle such as an automobile.

In recent years, a vehicle-body frame member extending in a longitudinal direction of a vehicle body is connected to a vehicle-body front structure member in a vehicle such as an automobile, and various chassis members and auxiliary equipments are also fitted thereto.

Furthermore, to improve the collision safety characteristic of a vehicle, it has been required for the vehicle-body front structure member to absorb collision energy at the time of a frontal collision of the vehicle.

Under such circumstances, Japanese Patent Application Laid-open No. 2007-112212 relates to a vehicle-body frame structure and has such a configuration that a pair of collapsing portion 12b that are collapsed and deformed in a shape of a bellows at the time of a frontal collision are respectively provided at the end of a pair of front-side frames 12 provided on opposite sides in a vehicle width direction, a main frame unit 12a having a high cross-section strength is provided in a rear part that is continuous to the collapsing portion 12b, both the members 12b and 12a are made of materials of a different thickness, and a joint surface 12c of the members 12b and 12a is formed in a tapered shape retreating obliquely backward from the inside in the vehicle width direction toward outside. By having such a configuration, an impact load F at the time of a frontal collision first reaches the inside of the joint surface 12c. Therefore, an input load becomes unbalanced, to generate a bending moment in the main frame unit 12a, and impact energy is absorbed by bending deformation at that time. The pair of collapsing portion 12b are connected by a cross member 13.

SUMMARY OF THE INVENTION

According to the studies by the present inventors, in Japanese Patent Application Laid-open No. 2007-112212, a vehicle-body frame structure that absorbs the collision energy at the time of a collision of a vehicle is realized. However, the collapsing portion 12b need to be connected separately by the cross member 13, which is a separate member. Therefore, the front structure of the vehicle body becomes complicated and there is a room for improvement of simplification of the configuration and of assemblability to the vehicle body.

Furthermore, according to the studies by the present inventors, in the vehicle-body frame structure in Japanese Patent Application Laid-open No. 2007-112212, a specific configuration for fitting an auxiliary equipment is not disclosed, and there is a room for improvement in terms of fitting the auxiliary equipment to the front of the vehicle body with a simple configuration, while maintaining the characteristic of absorbing the collision energy at the time of a collision of the vehicle.

The present invention has been achieved based on the studies described above, and an object of the present invention is to provide a vehicle-body front structure member as a structure unit that can fit an auxiliary equipment to a front of a vehicle body with a simple configuration, while realizing a characteristic of absorbing collision energy at the time of a collision of the vehicle.

To achieve the above object, a first aspect of the present invention is to provide a vehicle-body front structure member comprising: a tubular metal left member having a first plate thickness and extending in a longitudinal direction on a left side of a vehicle body; a tubular metal right member having a second plate thickness and extending in the longitudinal direction on a right side of the vehicle body; and a tubular metal lateral member having a third plate thickness, connecting the left member and the right member, and extending in a lateral direction of the vehicle body, wherein a rear end of the left member is a portion to be connected to a left frame member of the vehicle body, a rear end of the right member is a portion to be connected to a right frame member of the vehicle body, a front end of the left member and a left end of the lateral member are welded together while defining a first weld line, a front end of the right member and a right end of the lateral member are welded together while defining a second weld line, the first plate thickness and the second plate thickness are thinner than the third plate thickness, and strength of the left member and strength of the right member are respectively set to be lower than that of the lateral member, and wherein a support bracket that supports an auxiliary equipment is fitted to the lateral member, and the first weld line and the second weld line are respectively positioned outer side of the vehicle body with respect to the fitted position of the support bracket, so as not to overlap on the fitted position in the lateral member where the support bracket is fitted to the lateral member.

According to a second aspect of the present invention, in addition to the first aspect, the left member further includes an oblique portion welded to the left end of the lateral member at the first weld line, and extending obliquely backward from a left-front inner side of the vehicle body toward a left-rear outer side of the vehicle body, and the right member further includes an oblique portion welded to the right end of the lateral member at the second weld line, and extending obliquely backward from a right-front inner side of the vehicle body toward a right-rear outer side of the vehicle body.

According to a third aspect of the present invention, in addition to the first or second aspect, the lateral member further includes an oblique portion welded to the front end of the left member at the first weld line, and extending obliquely backward from the left-front inner side of the vehicle body toward the left-rear outer side of the vehicle body at the left end of the lateral member, and an oblique portion welded to the front end of the right member at the second weld line, and extending obliquely backward from the right-front inner side of the vehicle body toward the right-rear outer side of the vehicle body at the right end of the lateral member.

According to a fourth aspect of the present invention, in addition to any of the first to third aspects, the first weld line is defined by welding the front end of the left member to the left end of the lateral member by laser welding, and the second weld line is defined by welding the front end of the right member to the right end of the lateral member by laser welding.

According to a fifth aspect of the present invention, in addition to any of the first to fourth aspects, the support bracket includes a first bracket provided on the left end side of the lateral member and a second bracket provided on the right end side of the lateral member, and the first weld line is positioned leftward of the vehicle body with respect to the fitted position of the first bracket, so as not to overlap on the fitted position in the lateral member where the first bracket is fitted to the left end of the lateral member, and the second weld line is positioned rightward of the vehicle body with respect to the fitted position of the second bracket, so as not to overlap on the fitted position in the lateral member where the second bracket is fitted to the right end of the lateral member.

According to a sixth aspect of the present invention, in addition to any of the first to fifth aspects, the left member and the right member respectively include a corrugated portion, and a sectional area of the corrugated portion is set to be smaller than a sectional area of a portion where the corrugated portion is not provided in the left member and the right member.

According to a seventh aspect of the present invention, in addition to any of the first to sixth aspects, the auxiliary equipment is a radiator core that is arranged at the front of the vehicle body.

According to the configuration of the first aspect of the present invention, the vehicle-body front structure member comprises: the tubular metal left member having the first plate thickness and extending in the longitudinal direction on the left side of the vehicle body; the tubular metal right member having the second plate thickness and extending in the longitudinal direction on the right side of the vehicle body; and the tubular metal lateral member having the third plate thickness, connecting the left member and the right member, and extending in the lateral direction of the vehicle body. The rear end of the left member is a portion to be connected to the left frame member of the vehicle body, and the rear end of the right member is the portion to be connected to the right frame member of the vehicle body. The front end of the left member and the left end of the lateral member are welded together while defining the first weld line, and the front end of the right member and the right end of the lateral member are welded together while defining the second weld line. The first plate thickness and the second plate thickness are thinner than the third plate thickness, and the strength of the left member and the strength of the right member are respectively set to be lower than that of the lateral member. The support bracket that supports the auxiliary equipment is fitted to the lateral member. The first weld line and the second weld line are respectively positioned outer side of the vehicle body with respect to the fitted position of the support bracket, so as not to overlap on the fitted position in the lateral member where the support bracket is fitted to the lateral member. Accordingly, the vehicle-body front structure member as a structure unit that can fit an auxiliary equipment to the front of the vehicle body can be provided with a simple configuration, while realizing the characteristic of absorbing the collision energy at the time of a collision of the vehicle.

According to the configuration of the second aspect of the present invention, the left member further includes the oblique portion welded to the left end of the lateral member at the first weld line, and extending obliquely backward from the left-front inner side of the vehicle body toward the left-rear outer side of the vehicle body. The right member further includes the oblique portion welded to the right end of the lateral member at the second weld line, and extending obliquely backward from the right-front inner side of the vehicle body toward the right-rear outer side of the vehicle body. Accordingly, demands for a layout of the front of the vehicle body can be optimized, and the vehicle-body front structure member as a structure unit that can fit an auxiliary equipment to the front of the vehicle body can be provided with a simple configuration, while realizing the characteristic of absorbing the collision energy at the time of a collision of the vehicle.

According to the configuration of the third aspect of the present invention, the lateral member further includes the oblique portion welded to the front end of the left member at the first weld line, and extending obliquely backward from the left-front inner side of the vehicle body toward the left-rear outer side of the vehicle body at the left end of the lateral member, and the oblique portion welded to the front end of the right member at the second weld line, and extending obliquely backward from the right-front inner side of the vehicle body toward the right-rear outer side of the vehicle body at the right end of the lateral member. Accordingly, demands for a layout of the front of the vehicle body can be optimized, and the strength portion that supports the auxiliary equipment can be expanded, while realizing the characteristic of absorbing the collision energy at the time of a collision of the vehicle.

According to the configuration of the fourth aspect of the present invention, the first weld line is defined by welding the front end of the left member to the left end of the lateral member by laser welding, and the second weld line is defined by welding the front end of the right member to the right end of the lateral member by laser welding. Accordingly, a pre-molded product of the vehicle-body front structure member can be reliably molded, after an optimum material of a different thickness is obtained at the time of molding the pre-molded product of the vehicle-body front structure member. Furthermore, the vehicle-body front structure member as a structure unit accurately reflecting a designed shape can be obtained through a molding process such as so-called hydraulic forming thereafter.

According to the configuration of the fifth aspect of the present invention, the support bracket includes the first bracket provided on the left end side of the lateral member and the second bracket provided on the right end side of the lateral member. The first weld line is positioned leftward of the vehicle body with respect to the fitted position of the first bracket, so as not to overlap on the fitted position in the lateral member where the first bracket is fitted to the left end of the lateral member, and the second weld line is positioned rightward of the vehicle body with respect to the fitted position of the second bracket, so as not to overlap on the fitted position in the lateral member where the second bracket is fitted to the right end of the lateral member. Accordingly, the vehicle-body front structure member fitted with the auxiliary equipment at the front of the vehicle body can be obtained in a mode having a high support rigidity.

According to the configuration of the sixth aspect of the present invention, the left member and the right member respectively include the corrugated portion and the sectional area of the corrugated portion is set to be smaller than a sectional area of the portion where the corrugated portion is not provided in the left member and the right member. Accordingly, by adjusting the shape and the number of the corrugated portion, the deformation mode of the vehicle-body front structure member can be adjustable.

According to the configuration of the seventh aspect of the present invention, even if the auxiliary equipment is a bulky radiator core that is arranged at the front of the vehicle body, the vehicle-body front structure member reliably fitted with such a radiator core can be provided.

BRIEF DESCRIPTION OF THE DRAWINGS

FIG. 4 is a top view of a vehicle-body front structure member according to another modification of the embodiment of the present invention.

DETAILED DESCRIPTION OF THE PREFERRED EMBODIMENTS

Figure 1:
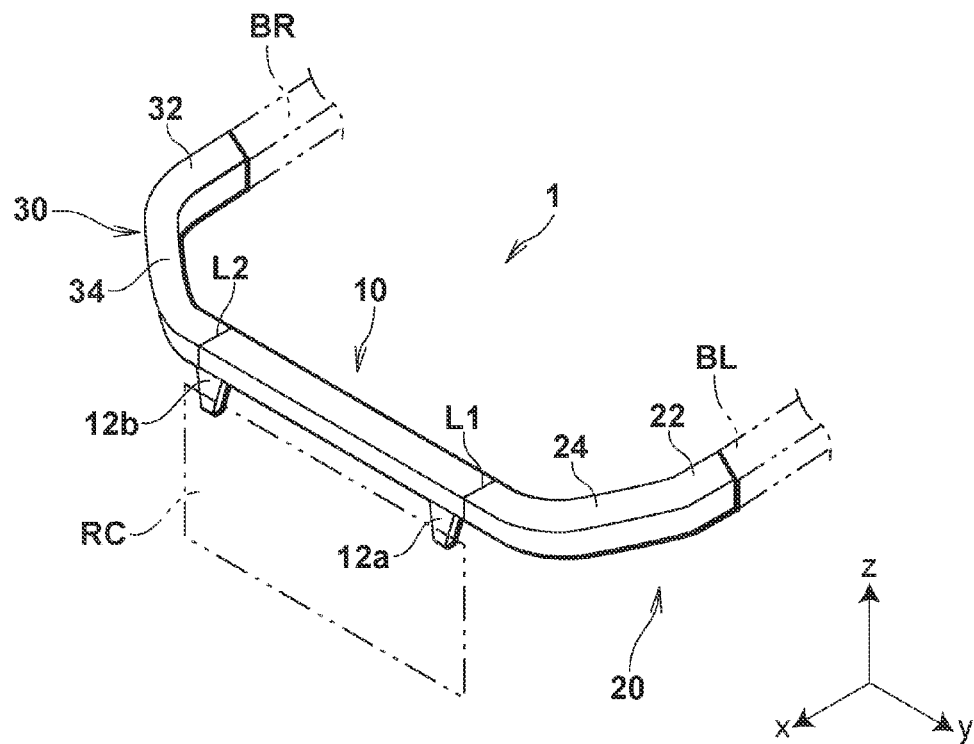
FIG. 1 is a perspective view of a vehicle-body front structure member according to an embodiment of the present invention.

Embodiments of a vehicle-body front structure member according to the present invention will be explained below in detail with reference to the drawings. In the drawings, an x-axis, a y-axis, and a z-axis form a three-axis orthogonal coordinate system. The positive direction of the x-axis is a forward direction of a vehicle body, the positive direction of the y-axis is a left direction of the vehicle body, and the positive direction of the z-axis is an upper direction of the vehicle body. A plane defined by the x-axis and y-axis is a horizontal surface of the vehicle body. Incidentally, the forward and rearward direction corresponds to a longitudinal direction of the vehicle-body, and the left and right direction corresponds to a lateral direction of the vehicle-body.

Figure 2:
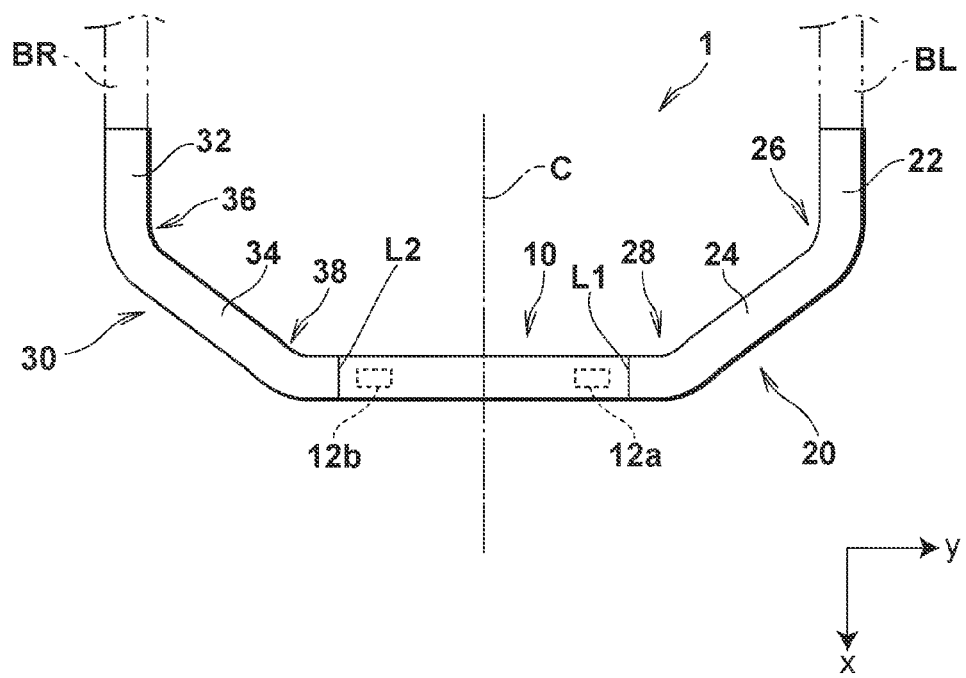
FIG. 2 is a top view of the vehicle-body front structure member according to the embodiment.

FIG. 1 is a perspective view of a vehicle-body front structure member according to the present embodiment. FIG. 2 is a top view of the vehicle-body front structure member according to the present embodiment.

As shown in FIGS. 1 and 2, a vehicle-body front structure member 1 is a tubular member made of metal such as iron and includes a lateral member 10, and a left member 20 and a right member 30 connected correspondingly to the lateral member 10 at the right and left ends of the lateral member 10. The lateral member 10, the left member 20, and the right member 30 typically extend on the horizontal surface of the vehicle body; however, can include a portion intersecting the horizontal surface.

Specifically, the lateral member 10 is a linear tubular member extending in the right and left direction of the vehicle body. Brackets 12a and 12b are correspondingly fixed by welding or the like to the right and left opposite ends of a bottom wall portion of the lateral member 10. The brackets 12a and 12b are typically the same member made of metal such as iron, and suspend and support an auxiliary equipment RC in cooperation with each other. The total number of the brackets 12a and 12b can be singular or plural.

The lateral member 10 is typically a tubular member having a rectangular shape in a longitudinal section. However, the shape is not limited thereto, and the lateral member 10 can have a circular or polygonal shape. The lateral member 10 can include a curved shape, a crooked shape, or the like so long as it can be evaluated that the lateral member 10 substantially extends in the right and left direction of the vehicle body. The brackets 12a and 12b can be fitted to the lateral member 10 by being fastened by fastening members such as bolts and nuts, or can be supported floatingly via an insulator. The brackets 12a and 12b can be a different component having a different shape from each other. The brackets 12a and the 12b can suspend and support a different auxiliary equipment RC. The brackets 12a and 12b can be provided in a front wall portion, other than the bottom wall portion of the lateral member 10, and can support the auxiliary equipment RC in other supporting modes such as mounting other than suspending, so long as the auxiliary equipment RC can be mounted on the front of the vehicle body.

The left member 20 includes a rear portion 22, which is a linear tubular member extending in the longitudinal direction of the vehicle body, and an oblique portion 24, which is a linear tubular member extending obliquely on the horizontal surface of the vehicle body, as a formed product made of the same material. The rear end of the rear portion 22 is fixed to a left frame member BL at the front of the vehicle body by welding or the like, and the front end of the rear portion 22 is continuous to the rear end of the oblique portion 24. The front end of the oblique portion 24 is fixed to the left end of the lateral member 10 by welding over the whole circumference in a longitudinal section as shown by a weld line L1. Because the front end and the rear end of the oblique portion 24 are respectively positioned inner and outer side of the vehicle body correspondingly, the inner front end of the oblique portion 24 is fixed to the left end of the lateral member 10, and the outer rear end of the oblique portion 24 is continuous to the front end of the rear portion 22 of the left member 20. In such a mode, the oblique portion 24 retreats obliquely backward from the left-front inner side of the vehicle body toward the left-rear outer side of the vehicle body and extends obliquely.

More specifically, a curved portion 26 having a protruding predetermined curvature diagonally forward left and outer side of the vehicle body on the horizontal surface of the vehicle body is provided between the outer rear end of the oblique portion 24 and the front end of the rear portion 22 as a formed product made of the same material as these, so as not to generate an unnecessary stress or the like. That is, the outer rear end of the oblique portion 24 and the front end of the rear portion 22 are continuous to each other via the curved portion 26. The inner front end of the oblique portion 24 includes a curved portion 28 having a protruding predetermined curvature diagonally forward left and outer side of the vehicle body on the horizontal surface of the vehicle body to alleviate the stress or the like, and is fixed by welding to the left end of the lateral member 10 via the curved portion 28. Furthermore, the weld line L1 is provided on the inner side of the vehicle body than a position where the curved portion 28 terminates in the inside of the vehicle body and at a position outer side of the vehicle body, not overlapping on the fitting position of the bracket 12a to the lateral member 10 by welding or the like.

The rear portion 22 and the oblique portion 24 in the left member 20 are typically a rectangular tubular member in a longitudinal section. However, the shape is not limited thereto, and these can be in a circular or polygonal shape. The rear portion 22 can include a curved shape, a crooked shape, or the like, so long as it can be evaluated that the rear portion 22 substantially extends in the longitudinal direction of the vehicle body. Furthermore, the oblique portion 24 can include a curved shape, a crooked shape, or the like, so long as it can be evaluated that the oblique portion 24 substantially extends obliquely on the horizontal surface of the vehicle body. The curved portion 26 and the curved portion 28 can have a shape that can be visually evaluated as a bent portion, with the curvatures thereof relatively becoming small. The weld line L1 can be provided at a position where the curved portion 28 terminates in the inside of the vehicle body, or in the vicinity thereof. When there is no room for providing the oblique portion 24 due to circumstances in a layout of the vehicle body or the like, the curved portion 26 is arranged between the front end of the rear portion 22 and the left end of the lateral member 10. Correspondingly, the weld line L1 is provided on the inner side of the vehicle body than the position where the curved portion 26 terminates in the inside of the vehicle body and at a position outer side of the vehicle body, not overlapping on the fitting position of the bracket 12a to the lateral member 10 by welding or the like. In this case, the weld line L1 can be provided at the position where the curved portion 26 terminates in the inside of the vehicle body or in the vicinity thereof.

The right member 30 typically has a shape symmetrical to the left member 20, with respect to a vehicle body center line C extending in the longitudinal direction of the vehicle body.

That is, the right member 30 includes a rear portion 32, which is a linear tubular member extending in the longitudinal direction of the vehicle body, and an oblique portion 34, which is a linear tubular member extending obliquely on the horizontal surface of the vehicle body, as a formed product made of the same material. The rear end of the rear portion 32 is fixed to a right frame member BR at the front of the vehicle body by welding or the like, and the front end of the rear portion 32 is continuous to the rear end of the oblique portion 34. The front end of the oblique portion 34 is fixed to the right end of the lateral member 10 by welding over the whole circumference in a longitudinal section as shown by a weld line L2. Because the front end and the rear end of the oblique portion 34 are respectively positioned inner and outer side of the vehicle body correspondingly, the inner front end of the oblique portion 34 is fixed to the right end of the lateral member 10, and the outer rear end of the oblique portion 34 is continuous to the front end of the rear portion 32 of the right member 30. In such a mode, the oblique portion 34 retreats obliquely backward from the right-front inner side of the vehicle body toward the right-backward-rear outer side of the vehicle body and extends obliquely.

More specifically, a curved portion 36 having a protruding predetermined curvature diagonally forward right and outer side of the vehicle body on the horizontal surface of the vehicle body is provided between the outer rear end of the oblique portion 34 and the front end of the rear portion 32 as a formed product made of the same material as these, so as not to generate an unnecessary stress or the like. That is, the outer rear end of the oblique portion 34 and the front end of the rear portion 32 are continuous to each other via the curved portion 36. The inner front end of the oblique portion 34 includes a curved portion 38 having a protruding predetermined curvature diagonally forward right and outer side of the vehicle body on the horizontal surface of the vehicle body to alleviate the stress or the like, and is fixed by welding to the right end of the lateral member 10 via the curved portion 38. Furthermore, the weld line L2 is provided on the inner side of the vehicle body than a position where the curved portion 38 terminates in the inside of the vehicle body and at a position outer side of the vehicle body, not overlapping on the fitting position of the bracket 12b to the lateral member 10 by welding or the like.

The rear portion 32 and the oblique portion 34 in the right member 30 are typically a rectangular tubular member in a longitudinal section. However, the shape is not limited thereto, and these can be in a circular or polygonal shape. The rear portion 32 can include a curved shape, a crooked shape, or the like, so long as it can be evaluated that the rear portion 32 substantially extends in the longitudinal direction of the vehicle body. Furthermore, the oblique portion 34 can include a curved shape, a crooked shape, or the like, so long as it can be evaluated that the oblique portion 34 substantially extends obliquely on the horizontal surface of the vehicle body. When circumstances in the layout of the vehicle body are taken into consideration, the right member 30 can typically have a shape asymmetrical to the left member 20, with respect to the vehicle body center line C extending in the longitudinal direction of the vehicle body. The curved portion 36 and the curved portion 38 can have a shape that can be visually evaluated as a crooked portion, with the curvatures thereof relatively becoming small. The weld line L2 can be provided at a position where the curved portion 38 terminates in the inside of the vehicle body, or in the vicinity thereof. When there is no room for providing the oblique portion 34 due to circumstances in the layout of the vehicle body or the like, the curved portion 36 is arranged between the front end of the rear portion 32 and the right end of the lateral member 10. Correspondingly, the weld line L2 is provided on the inner side of the vehicle body than the position where the curved portion 36 terminates in the inside of the vehicle body and at a position outer side of the vehicle body, not overlapping on the fitting position of the bracket 12b to the lateral member 10 by welding or the like. In this case, the weld line L2 can be provided at the position where the curved portion 36 terminates in the inside of the vehicle body or in the vicinity thereof.

The vehicle-body front structure member 1 is formed of a so-called material of a different thickness. That is, in the vehicle-body front structure member 1, the plate thickness of the left member 20 and the plate thickness of the right member 30 are thinner than that of the lateral member 10, and the plate thickness of the left member 20 and the plate thickness of the right member 30 are typically the same with each other. The respective materials of the lateral member 10, the left member 20, and the right member 30 are typically an iron material or an aluminum material, and these can be the same material or can be a different material. However, the strength of both the left member 20 and the right member 30 is set to be lower than that of the lateral member 10. For welding between the lateral member 10, the left member 20, and the right member 30 defined by the weld lines L1 and L2, tubular materials of a different thickness need to be welded after the plate-like material of a different thickness is molded into a tubular shape. Accordingly, it is preferable to use laser welding.

To manufacture the vehicle-body front structure member 1 having the above configuration, processes described below are typically performed.

Base materials of the lateral member 10, the left member 20, and the right member 30, which are respectively a plate-like material of a different thickness, are prepared first, and blanking and piercing are respectively performed with respect to the base materials to obtain a single blank material having a predetermined shape.

Next, the corresponding ends of the blank material to be the lateral member 10 and of the blank material to be the left member 20 are butted and laser welded, and the corresponding ends of the blank material to be the lateral member 10 and of the blank material to be the right member 30 are butted and laser welded, thereby obtaining an integral blank material, which is a material of a different thickness.

The integral blank material is then bent in a tubular shape, and the opposite ends of the integral blank material are butt welded to obtain a premolded product of the vehicle-body front structure member 1, which is a linear tubular member.

The molding process such as so-called hydraulic forming is then performed with respect to the premolded product of the vehicle-body front structure member 1, to obtain a primary member of the vehicle-body front structure member 1, excluding the brackets 12a and 12b.

Lastly, the brackets 12a and 12b are fitted to a predetermined position of the lateral member 10, thereby acquiring the vehicle-body front structure member 1 as a completed product.

In a configuration in which the vehicle-body front structure member 1 having the above configuration is fixed to the right and left frame members BL and BR at the front of the vehicle body, and the auxiliary equipment RC is fastened to the brackets 12a and 12b by fastening members such as bolts and nuts, when a vehicle having the vehicle body has received a collision load such as a frontal collision, because the strength of both the left member 20 and the right member 30 is set to be lower than that of the lateral member 10, the left member 20 deforms in such a mode that the oblique portion 24 collapses to the inner rear side of the vehicle body and is collapsed, and the rear portion 22 is collapsed toward the back of the vehicle body. Furthermore, the right member 30 deforms in such a mode that the oblique portion 34 collapses to the inner rear side of the vehicle body and is collapsed, and the rear portion 32 is collapsed toward the back of the vehicle body. Accordingly, the lateral member 10 in which the auxiliary equipment RC is fitted to the brackets 12a and 12b is allowed to move backward of the vehicle body based on a preliminary designed quantity, while absorbing mechanical energy due to the collision.

The vehicle-body front structure member 1 having the above configuration can be preferably applied as a radiator core support that supports a radiator core of the vehicle.

In this case, specifically, the auxiliary equipment RC is a radiator core of a radiator that performs heat exchange with cooling water in a water-cooled engine such as a water-cooled internal combustion engine of a vehicle. The radiator core is fastened to the brackets 12a and 12b by the fastening members such as bolts and nuts, and arranged at the front of the vehicle body. The brackets 12a and 12b function as radiator core support brackets that support the radiator core with respect to the vehicle body via the vehicle-body front structure member 1.

The auxiliary equipment RC is not limited to the radiator core, and only needs to be an auxiliary equipment having the size and weight of a level that is not substantially negligible, when considering a deformation mode of the vehicle body at the time of a frontal collision or the like of the vehicle.

The brackets 12a and 12b can be fitted correspondingly to the left member 20 and the right member 30 in addition to the lateral member 10. However, in this case, the fitting strength of the brackets 12a and 12b to the left member 20 and the right member 30 is respectively set to be lower than that of the brackets 12a and 12b fitted to the lateral member 10, and the influence of fitting portions of the brackets 12a and 12b with respect to the left member 20 and the right member 30 only needs to be a level that is substantially negligible, when considering a deformation mode of the vehicle body at the time of a frontal collision or the like of the vehicle.

As for the vehicle-body front structure member 1 having the configuration described above, various modifications can be conceived.

Figure 3:
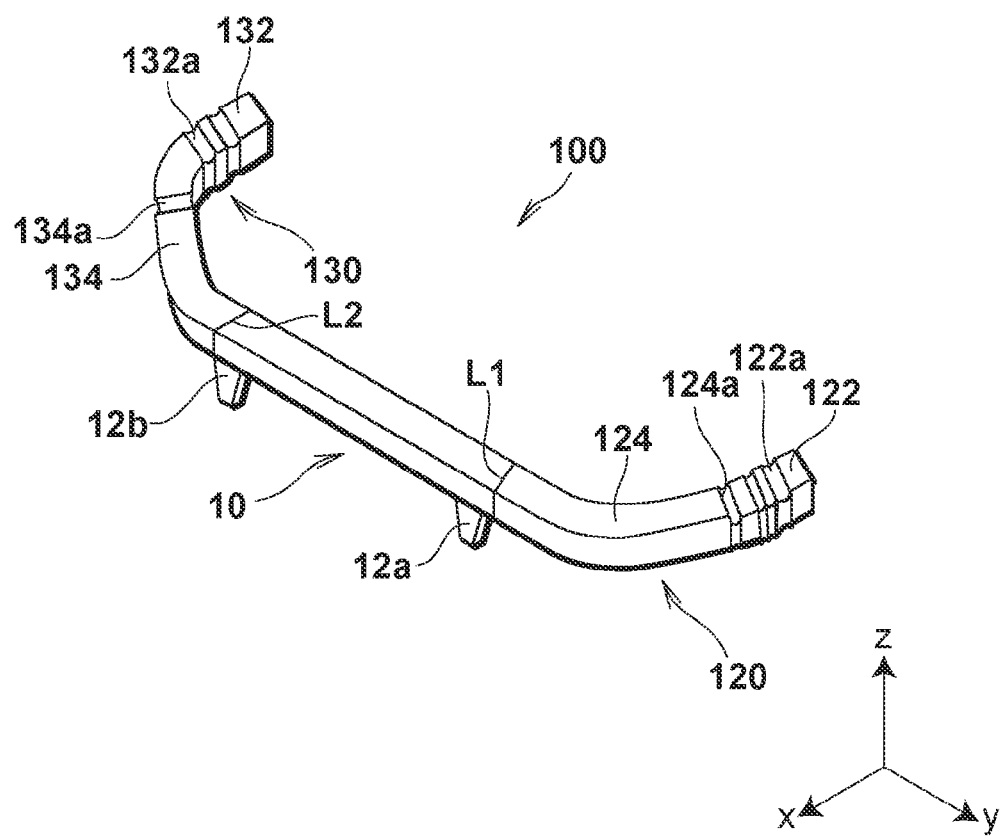
FIG. 3 is a perspective view of a vehicle-body front structure member according to a modification of the embodiment of the present invention.

FIG. 3 is a perspective view of a vehicle-body front structure member according to a modification.

As shown in FIG. 3, in a vehicle-body front structure member 100 according to this modification, a different feature thereof from the vehicle-body front structure member 1 is that configurations of a left member 120 and a right member 130 are different from those of the left member 20 and the right member 30 in the vehicle-body front structure member 1. Therefore, only the different feature is focused on and explained, and like reference characters refer to like constituent elements and explanations thereof will be simplified or omitted as appropriate.

Specifically, in the vehicle-body front structure member 100, a plurality of corrugated portions 122a and 124a are provided correspondingly in a rear portion 122 and an oblique portion 124 of the left member 120, and a plurality of corrugated portions 132a and 134a are provided correspondingly in a rear portion 132 and an oblique portion 134 of the right member 130.

In the corrugated portions 122a and 124a and the corrugated portions 132a and 134a, the longitudinal sectional areas of these portions are set to be smaller than the longitudinal sectional area of a general portion other than these corrugated portions. That is, the corrugated portions 122a and 124a and the corrugated portions 132a and 134a function as fragile portions.

To manufacture the vehicle-body front structure member 100 having the above configuration, the corrugated portions 122a and 124a and the corrugated portions 132a and 134a can be molded together at the time of performing so-called hydraulic forming with respect to a premolded product of the vehicle-body front structure member 100. The corrugated portions 122a and 124a and the corrugated portions 132a and 134a can be molded in the previous process.

Furthermore, in the vehicle-body front structure member 100 having the above configuration, when a vehicle including the vehicle body having the vehicle-body front structure member 100 incorporated therein has received a collision load such as a frontal collision, by adjusting the shape or the number of the corrugated portions 122a and 124a and the corrugated portions 132a and 134a, the deformation modes of the rear portion 122 and the oblique portion 124 of the left member 120 and the rear portion 132 and the oblique portion 134 of the right member 130 can be adjustable. The respective numbers of the corrugated portions 122a and 124a and the corrugated portions 132a and 134a are not limited, and only one can be provided respectively, or one or a plurality of corrugated portions can be provided in only one of the left member 120 and the right member 130.

FIG. 4 is a top view of a vehicle-body front structure member according to another modification.

As shown in FIG. 4, in a vehicle-body front structure member 200 according to this modification, it is a different feature from the lateral member 10, the left member 20, and the right member 30 in the vehicle-body front structure member 1 that a lateral member 210 includes oblique portions 212 and 214 at opposite right and left ends of the lateral member 210, and an oblique portion 224 of a left member 220 and an oblique portion 234 of a right member 230 are shortened correspondingly.

Specifically, in the vehicle-body front structure member 200, because the lateral member 210 includes the oblique portions 212 and 214 via curved portions 216 and 218 correspondingly at the opposite right and left ends of the lateral member 210, an inner front end of the oblique portion 224 of the left member 220 and an outer rear end of the oblique portion 212 of the lateral member 10 are fixed, defining the weld line L1. On the other hand, an inner front end of the oblique portion 234 of the left member 230 and an outer rear end of the oblique portion 214 of the lateral member 210 are fixed, defining the weld line L2. Correspondingly, the weld line L1 is positioned between the inner front end of the oblique portion 224 of the left member 220 and the outer rear end of the oblique portion 212 of the lateral member 10, and the weld line L2 is positioned between the inner front end of the oblique portion 234 of the right member 230 and the outer rear end of the oblique portion 214 of the lateral member 210. The brackets 12a and 12b can be fitted to the oblique portions 212 and 214 of the lateral member 210. The oblique portions 212 and 214 of the lateral member 210 can be extended further so that the oblique portions 212 and 214 are connected directly to the rear portion 22 of the left member 220 and the rear portion 32 of the right member 230. In this case, the oblique portion 224 of the left member 220 and the oblique portion 234 of the right member 230 are omitted.

In the vehicle-body front structure member 200 having the above configuration, a fittable range of the auxiliary equipment RC is enlarged corresponding to the fact that the oblique portions 212 and 214 are provided in the lateral member 210. Needless to say, the respective corrugated portions shown in FIG. 3 can be applied to the vehicle-body front structure member 200 according to this modification.

As described above, according to the configuration of the present embodiment, the vehicle-body front structure member includes: the tubular metal left member 20, 120 having the first plate thickness and extending in the longitudinal direction on the left side of the vehicle body; the tubular metal right member 30, 130 having the second plate thickness and extending in the longitudinal direction on the right side of the vehicle body; and the tubular metal lateral member 10 having the third plate thickness, connecting the left member and the right member, and extending in the lateral direction of the vehicle body. The rear end of the left member is a portion to be connected to the left frame member BL of the vehicle body, and the rear end of the right member is the portion to be connected to the right frame member BR of the vehicle body. The front end of the left member and the left end of the lateral member are welded together while defining the first weld line L1, and the front end of the right member and the right end of the lateral member are welded together while defining the second weld line L2. The first plate thickness and the second plate thickness are thinner than the third plate thickness, and the strength of the left member and the strength of the right member are respectively set to be lower than that of the lateral member. The support brackets 12a and 12b that support the auxiliary equipment RC are fitted to the lateral member. The first weld line and the second weld line are positioned outer side of the vehicle body with respect to the fitted position of the support bracket, so as not to overlap on the fitted position in the lateral member where the support bracket is fitted to the lateral member. Accordingly, the vehicle-body front structure members 1 and 100 as a structure unit that can fit an auxiliary equipment to the front of the vehicle body can be provided with a simple configuration, while realizing the characteristic of absorbing the collision energy at the time of a collision of the vehicle.

The left member 20, 120 further includes the oblique portion 24, 124 welded to the left end of the lateral member 10 at the first weld line L1, and extending obliquely backward from the left-front inner side of the vehicle body toward the left-rear outer side of the vehicle body. The right member 30, 130 further includes the oblique portion 34, 134 welded to the right end of the lateral member 10 at the second weld line L2, and extending obliquely backward from the right-front inner side of the vehicle body toward the right-rear outer side of the vehicle body. Accordingly, demands for a layout of the front of the vehicle body can be optimized, and the vehicle-body front structure members 1 and 100 as a structure unit that can fit an auxiliary equipment to the front of the vehicle body can be provided with a simple configuration, while realizing the characteristic of absorbing the collision energy at the time of a collision of the vehicle.

The lateral member 210 includes the oblique portion 212 welded to the front end of the left member 220 at the first weld line L1, and extending obliquely backward from the left-front inner side of the vehicle body toward the left-rear outer side of the vehicle body at the left end of the lateral member 210, and the oblique portion 214 welded to the front end of the right member 230 at the second weld line L2, and extending obliquely backward from the right-front inner side of the vehicle body toward the right-rear outer side of the vehicle body at the right end of the lateral member 210. Accordingly, demands for a layout of the front of the vehicle body can be optimized, and the strength portion that supports the auxiliary equipment can be expanded, while realizing the characteristic of absorbing the collision energy at the time of a collision of the vehicle.

The first weld line L1 is defined by welding the front end of the left member 20, 120 to the left end of the lateral member 10 by laser welding, and the second weld line L2 is defined by welding the front end of the right member 30, 130 to the right end of the lateral member 10 by laser welding. Accordingly, the premolded product of the vehicle-body front structure member can be reliably molded, after an optimum material of a different thickness is obtained at the time of molding the premolded product of the vehicle-body front structure member. Furthermore, the vehicle-body front structure members 1 and 100 as a structure unit accurately reflecting the designed shape can be obtained through the molding process such as so-called hydraulic forming thereafter.

The support bracket includes the first bracket 12a provided on the left end side of the lateral member 10 and the second bracket 12b provided on the right end side of the lateral member 10. The first weld line L1 is positioned leftward of the vehicle body with respect to the fitted position of the first bracket, so as not to overlap on the fitted position in the lateral member where the first bracket is fitted to the left end of the lateral member, and the second weld line L2 is positioned rightward of the vehicle body with respect to the fitted position of the second bracket, so as not to overlap on the fitted position in the lateral member where the second bracket is fitted to the right end of the lateral member. Accordingly, the vehicle-body front structure members 1 and 100 fitted with the auxiliary equipment RC at the front of the vehicle body can be obtained in the mode having a high support rigidity.

The left member 120 and the right member 130 respectively include corrugated portions 122a, 124a and 132a, 134a and the sectional area of the corrugated portions is set to be smaller than the sectional area of the portion where the corrugated portion is not provided in the left member and the right member. Accordingly, by adjusting the shape and the number of the corrugated portions, the deformation mode of the vehicle-body front structure member 100 can be adjustable.

Even if the auxiliary equipment RC is a bulky radiator core that is arranged at the front of the vehicle body, the vehicle-body front structure members 1 and 100 reliably fitted with such a radiator core can be obtained.

What is claimed is:

1. A vehicle-body front structure member comprising:
a tubular metal left member having a first plate thickness and extending in a longitudinal direction on a left side of a vehicle body, with a rear end of the left member being a portion to be connected to a left frame member of the vehicle body;
a tubular metal right member having a second plate thickness and extending in the longitudinal direction on a right side of the vehicle body, with a rear end of the right member being a portion to be connected to a right frame member of the vehicle body; and
a tubular metal lateral member having a third plate thickness, connecting the left member and the right member, and extending in a lateral direction of the vehicle body, with a support bracket that supports an auxiliary equipment being fitted to the lateral member, wherein
a front end of the left member and a left end of the lateral member are welded together while defining a first weld line, a front end of the right member and a right end of the lateral member are welded together while defining a second weld line, the first plate thickness and the second plate thickness are thinner than the third plate thickness, and strength of the left member and strength of the right member are respectively set to be lower than that of the lateral member, and wherein the first weld line and the second weld line are respectively positioned at an outer side of the vehicle body with respect to the fitted position of the support bracket, so as not to overlap on the fitted position in the lateral member where the support bracket is fitted to the lateral member.

2. The vehicle-body front structure member according to claim 1, wherein the left member further includes an oblique portion welded to the left end of the lateral member at the first weld line, and extending obliquely backward from a left-front inner side of the vehicle body toward a left-rear outer side of the vehicle body, and wherein the right member further includes an oblique portion welded to the right end of the lateral member at the second weld line, and extending obliquely backward from a right-front inner side of the vehicle body toward a right-rear outer side of the vehicle body.

3. The vehicle-body front structure member according to claim 1, wherein the lateral member includes an oblique portion welded to the front end of the left member at the first weld line, and extending obliquely backward from the left-front inner side of the vehicle body toward the left-rear outer side of the vehicle body at the left end of the lateral member, and an oblique portion welded to the front end of the right member at the second weld line, and extending obliquely backward from the right-front inner side of the vehicle body toward the right-rear outer side of the vehicle body at the right end of the lateral member.

4. The vehicle-body front structure member according to claim 1, wherein the first weld line is defined by welding the front end of the left member to the left end of the lateral member by laser welding, and wherein the second weld line is defined by welding the front end of the right member to the right end of the lateral member by laser welding.

5. The vehicle-body front structure member according to claim 1, wherein the support bracket includes a first bracket provided on the left end side of the lateral member and a second bracket provided on the right end side of the lateral member, and wherein the first weld line is positioned leftward of the vehicle body with respect to the fitted position of the first bracket, so as not to overlap on the fitted position in the lateral member where the first bracket is fitted to the left end of the lateral member, and the second weld line is positioned rightward of the vehicle body with respect to the fitted position of the second bracket, so as not to overlap on the fitted position in the lateral member where the second bracket is fitted to the right end of the lateral member.

6. The vehicle-body front structure member according to claim 1, wherein the left member and the right member respectively include a corrugated portion, and a sectional area of the corrugated portion is set to be smaller than a sectional area of a portion where the corrugated portion is not provided in the left member and the right member.

7. The vehicle-body front structure member according to claim 1, wherein the auxiliary equipment is a radiator core that is arranged at the front of the vehicle body.

* * * * *